United States Patent [19]
Tanaka

[11] 3,848,499
[45] Nov. 19, 1974

[54] APPARATUS FOR MECHANICALLY CUTTING FLANGES FROM PRESHAPED STEEL CONSTRUCTION MEMBERS

[76] Inventor: Ichiro Tanaka, 4-3 Kudegadanicho, Nishinomiya, Hyogo Prefecture, Japan

[22] Filed: Aug. 10, 1973

[21] Appl. No.: 387,251

[30] Foreign Application Priority Data
Aug. 11, 1972 Japan.............................. 47-81031

[52] U.S. Cl. ............................................... 83/461
[51] Int. Cl. ......................................... B26d 7/02
[58] Field of Search...................... 83/452, 460, 461

[56] References Cited
UNITED STATES PATENTS

| | | | |
|---|---|---|---|
| 528,738 | 11/1894 | Pfouts.................................. | 83/461 |
| 594,019 | 11/1897 | Jefferies............................... | 83/461 |
| 2,165,614 | 7/1939 | Cook et al. ....................... | 83/460 X |

*Primary Examiner*—Willie G. Abercrombie
*Attorney, Agent, or Firm*—Mason, Fenwick & Lawrence

[57] ABSTRACT

Mechanical and hydraulic operated cutting apparatus for removing flange portions from pre-shaped steel construction members having one or more flanges connected with a body web portion. The apparatus comprises two cutting blades spaced apart by an adjustable distance, and a mechanism by which the cutting blades are pressed against and retracted from the article to be cut. The apparatus is designed to replace gas torch cutting, and includes structural supports for the shaped steel beam or article at its opposite flanges. The apparatus further includes two adjustable metal support members having surfaces to be pressed against both the inner faces of the opposite flanges of the article and the underside of the adjacent portions of the flange-connecting web. The adjustable support members are yieldable responsive to the shearing movement of the cutting blades against the web. The opposite flanges of the article thus are mechanically cut off from its web at the junctions between the flanges and the web by the two shearing blades at the same time. As compared with conventional gas torch type cutting, the apparatus assures greatly improved efficiency, produces uniform cut portions and is free of ecological and other objections to be experienced with the use of gas.

6 Claims, 5 Drawing Figures

3,848,499

APPARATUS FOR MECHANICALLY CUTTING FLANGES FROM PRESHAPED STEEL CONSTRUCTION MEMBERS

BACKGROUND OF THE INVENTION

This invention relates to an apparatus for cutting shaped steel material such as wide-flange sections and the like, and more particularly to an apparatus for cutting of the opposite flanges of a wide-flange section, or the like, from its web simultaneously at the junctions between the flanges and the web.

With the rapidly increasing development of industries in recent years, there is a growing demand for shaped steel for use in constructing buildings, ships and bridges, resulting in an immense amount of waste material being produced or left over when the manufactured steel is put to use in such construction projects. Shaped steel is manufactured by various steel making processes which may include extruding, also certain rolling processes or by welding roll-formed steel sheets. When the resulting pre-shaped steel is subsequently cut to specified dimensions, short lengths of waste material inevitably are produced. Furthermore, even the use of pre-shaped steel members of a standard length entails a considerable amount of waste in short lengths when it is cut to the desired dimensions at the construction site to fabricate a building, ship or bridge.

To salvage and utilize such waste as a material for small round bars or forgeable material instead of discarding the waste as scrap, there arises a need to separate the flanges from the web, which heretofore has been conducted by means of gas torch cutting. However, gas torch cutting is costly, requires much time and labor and is therefore inefficient. Moreover, the use of gas produces noxious odors and fumes and is harmful, causing air pollution in the ambient atmosphere and neighborhood, impairing health of the operator and giving rise to other environmental problems. In addition, gas torch cutting results in irregular cut portions, is more liable to cause deterioration of the properties of the material, and is not economical because of the cutting loss involved.

SUMMARY OF THE INVENTION

The principal object of this invention is to provide novel apparatus for mechanically and/or hydraulically cutting flanges from shaped steel to overcome the disadvantages described above.

Another object of this invention is to provide an apparatus for cutting such shaped steel without causing environmental problems heretofore experienced with gas cutting.

Still another object of this invention is to provide an apparatus for cutting the flanges from shaped steel resulting in cut portions of a uniform shape without unduly wasting the material.

More specifically, the object of this invention is achievable by providing unique apparatus including a novel combination of fixed and yieldable support means for the piece of shaped steel, and a pair of cutting blades spaced apart by an adjustable distance by which apparatus the opposite flanges of a wide-flange section or the like of shaped steel material can be mechanically, efficiently and expeditiously cut off from its web simultaneously at the junctions therebetween.

The foregoing and other objects and advantages will become apparent from the following more detailed description taken in conjunction with the illustrative drawings.

DETAILED DESCRIPTION OF THE INVENTION

Figure 1:
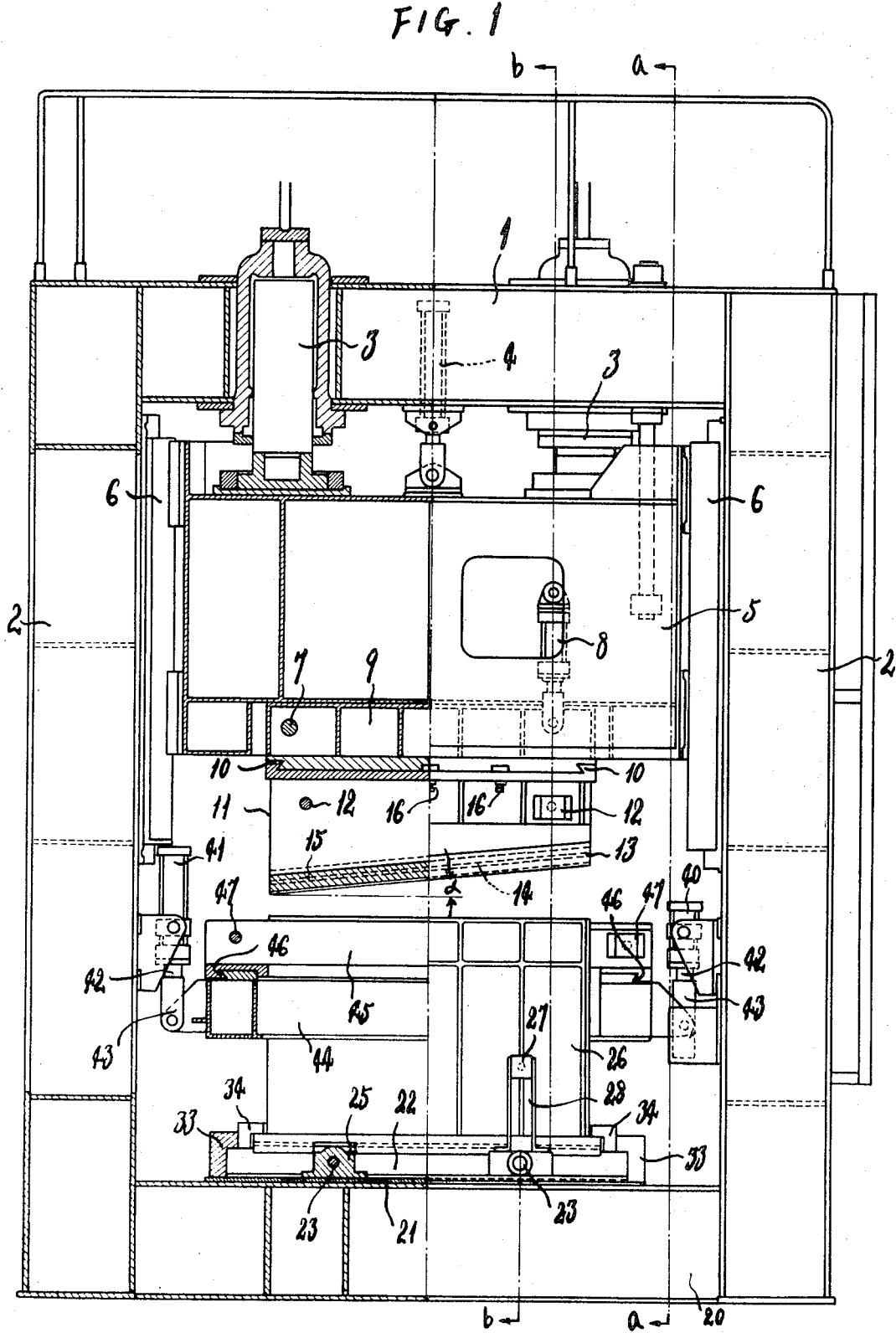
FIG. 1 is a view showing an embodiment of this invention, with one-half of the view being shown in cross-section.

An embodiment of the upright type press apparatus will be described with reference to the drawings, wherein like reference characters designate like parts throughout the several figures. Indicated at 1 is an upper frame, which connects a pair of spacedapart side frames 2,2. Mounted on the upper frame 1 are hydraulically operable main piston-and-cylinder means 3,3 and likewise hydraulically operable auxiliary or secondary piston-and-cylinder means 4. Cutting blades to be described later are respectively pressed or pushed against and retracted from an article to be cut by these respective cylinder means. A slider or header 5 is raised and lowered slidably along guides 6,6 on the side frames 2,2.

The slider 5 is provided with a lower tiltable frame 9 having one end pivotally connected thereto by a hinge 7 (FIG. 1) and the other end movable or tiltable by tilting cylinder means 8,8. Portions of opposing cutting blade supports 11,11 are slidably fitted in grooves 10,10 of the tiltable frame 9. The distance between the cutting blades 13,13 is adjustable by piston-and-cylinder means 12,12. The blade supports 11,11 are formed in their opposed inner faces with grooves 14,14 for receiving therein a combination web-backup and rigidifying spacer member 15. To fix the blade supports 11,11 in spaced position, there are provided lock bolts 16,16 (FIG. 1) with upper ends thereof bearing against the tiltable frame 9, whereby the spacing between the cutting or shearing blades 13,13 is maintained perfectly. If the article to be cut can be cut with a moderate pressure depending on the thickness and size of the article and like conditions, the spacing between the cutting blades 13,13 need not always be supplementally braced and maintained as perfectly as above.

Figure 2:
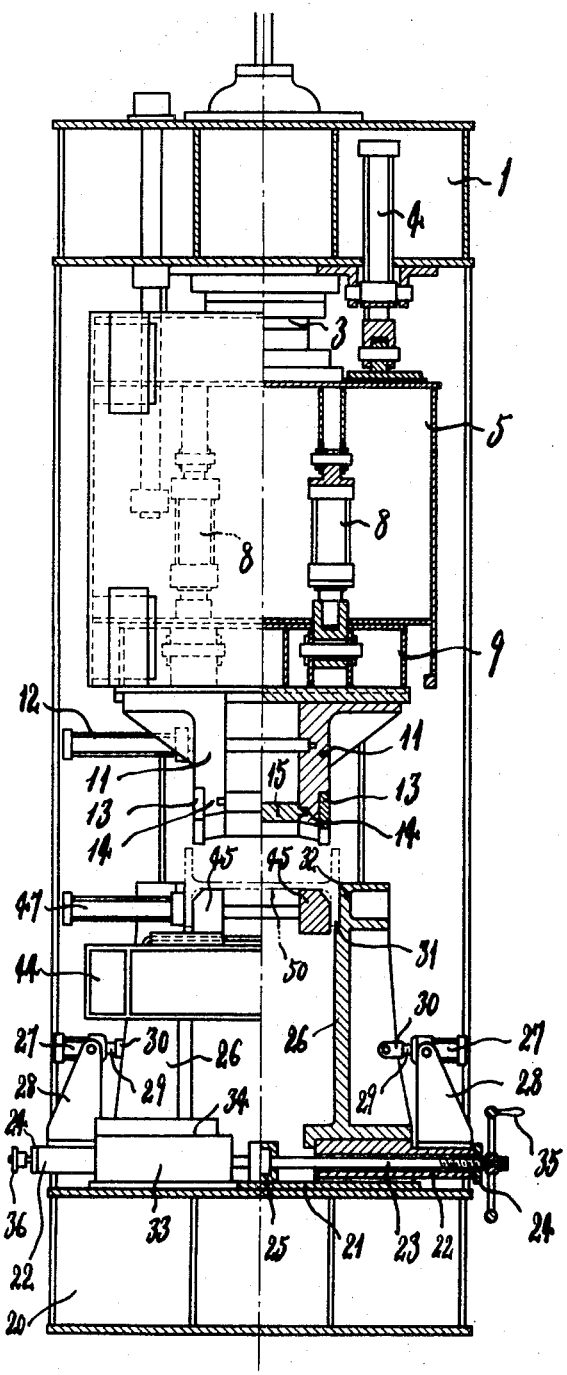
FIG. 2 is a side elevation shown partly in vertical cross-section, the left half of the view being taken along the line $a-a$ in FIG. 1, and the right half of the view along the line $b-b$ in FIG. 1.

The apparatus further includes a lower frame 20, interconnecting the lower ends of side frame members 2,2 and carrying thereon bases 21,21 on which sliding plates 22,22 are slidably mounted. The sliding plates 22,22 are integral with nuts 24,24 in screw-thread engagement with drive screws 23,23. When rotated by a handle 35 (FIG. 2), the drive screws 23,23 move the nuts 24,24 to slidingly move the sliding plates 22,22 an equal distance in opposite directions toward or away from the center of the lower frame 20. Indicated at 25,25 (FIGS. 1 and 2) are thrust bearings for preventing the screws 23,23 from displacement axially thereof. Upright supports 26,26 for the article 50 to be cut respectively have lower portions which are slidable on the sliding plates 22,22, and have upper portions, to be described, which are adaptable to frictionally engage opposite end surfaces of the flanges 51,51 of the article 50. Additional piston-and-cylinder means 27,27 are provided to slide the upright supports 26,26 forward and backward and are mounted on the sliding plates 22,22 by brackets 28,28. The piston-and-cylinder means 27,27 have piston rods 29,29 connected at their distal ends to supports 26,26 by preferably metal bracket members 30,30. The upright supports 26,26 have notched shoulder support portions 31,31 (FIGS. 2–5) for supporting the article and bearing the cutting force acting thereon, and also include flange-clamping portions 32,32 for holding the article in position. Lower sets of side guides 33,33, and 34,34 are provided for guiding the sliding plates 22,22 and upright supports 26,26. Chain sprocket wheels 36 (FIG. 2) are provided for operatively associating the two drive screws 23,23 with each other, when rotated by the handle 35 (FIG. 2).

Figure 4:
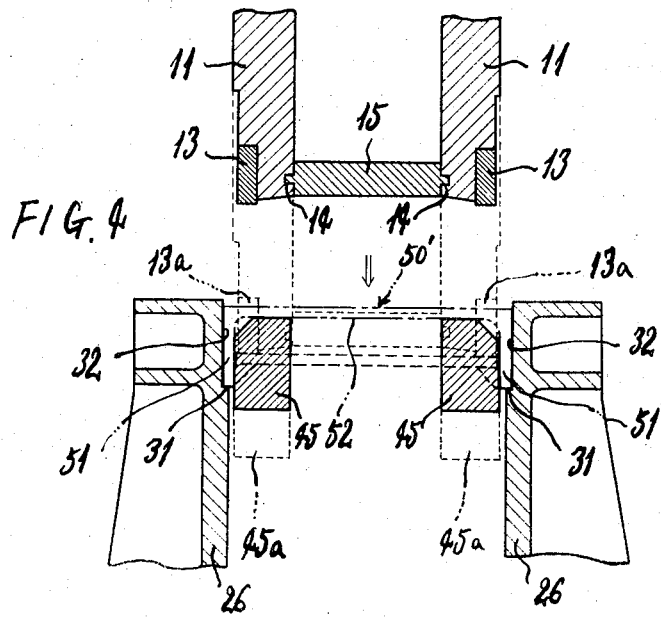
FIG. 4 is a similar cross-sectional view showing the embodiment in the same states as FIG. 3, but with a different type of shaped article to be cut as shown in dash-dot outline.

The side frames 2,2 are provided with a different pair of opposed piston-and-cylinder means 40,41 having piston rods 42,42 connected at their lower distal ends to a movable beam 44 by metal bracket members 43,43. The movable beam 44 is formed at its opposite ends with grooves 46,46 in which portions of metallic protective or internal support members 45,45 fit for sliding movement. The piston-and-cylinder means 47,47 for adjusting the lateral distance between these support or protective members 45,45 operate to press the said protective members 45,45 preferably against both the opposed inner faces of flanges 51,51 and against the lower surface of the interconnecting web 52 of the article 50 in preparation for a cutting operation. The article 50 is shown in dash-dot outline and comprises and H- or I-beam section in FIGS. 2, 3 and 5, whereas it comprises a channel section 50', as shown in FIG. 4.

The various piston-and-cylinder means 40,41, 47,47 collectively serve as means for adjusting the position where the article 50 to be cut is held. Among these, the pistons in the cylinder means 41 (FIG. 1) are adapted to retract or move downwardly when the downwardly advancing inclined cutting blades 13,13 commence to progressively shear off the flanges at their web intersection. The displaced movements are shown in dashed lines in FIGS. 3 and 4, with the yieldable support members being designated 45a,45a in the displaced positions.

In preparation for the operation of the present apparatus, having in mind the construction described above, the handle 35 (FIG. 2) is first turned to determine the positions of the sliding plates 22,22 in accordance with the size of the article to be cut, e.g. wide-flange section or H-shaped steel material. At the same time, the piston-and-cylinder means 27,27 are operated to obtain the prerequisite distance between the opposed clamping portions 32,32 on upright supports 26,26 for the placement of the article to be cut. Next, the corresponding correct distance between the cutting blades 13,13 is obtained by operation of the piston-and-cylinder means 12,12. An appropriate sized spacer 15 is fitted to and in between blades 13,13 and the bolts 16,16 are fastened to fix the blade supports 11,11 to the tiltable frame 9. The piston-and-cylinder means 47,47 are then operated to simultaneously retract the supporting or protective members 45,45 inwardly toward one another so that the article to be cut initially can be placed in position. The level and width of these supporting and protective members 45,45 is then appropriately adjusted by the said piston-and-cylinder means 40,41 and 47,47 in accordance with the height of the web and the width of the flanges 51,51 of the wide-flange section.

After the apparatus has been made ready for operation, the article 50 to be cut is fed to the apparatus by a feeder, whereupon the piston-and-cylinder means 27,27 are operated to advance the upright supports 26,26 to bring the said clamping portions 32,32 into pressing contact with the flanges 51,51 (FIGS. 3 and 4) of the article 50 and to thereby hold the article 50 therebetween and on notched shoulders 31,31. Subsequently, the said means 47,47 are operated to press the protective metal support members 45,45 against the inner faces of the flanges 51,51 and the underside of the web 52 of the article 50. The tilting piston-and-cylinder means 8,8 are then preferably lowered to bring the cutting blades 13,13 to a substantially horizontal position in parallel to the article to be cut. The main piston-and-cylinder means 3,3 and the pistons of the auxiliary cylinder means 4 are then lowered with a low hydraulic pressure to initially form a starting cut or groove in the article 50 at the position where it is to be cut. The cutting blades 13,13 are thereafter slightly raised by the said auxiliary piston-and-cylinder means 4. When the blades are completely raised, the other piston-and-cylinder means 8,8 are moved up to position the blades 13,13 at a specified shearing angle $\alpha$. At this time, the top face of the tiltable frame 9 is in intimate contact with the under face of the slider 5 so as to render the hinge 7 and said piston-and-cylinder means 8,8 free of the shearing load.

After the predetermined shearing angle $\alpha$ has been set in this way, oil of high pressure is introduced in a conventional manner into the main cylinders of the means 3,3 to force down the slider 5 together with help from the auxiliary piston-and-cylinder means 4, causing the cutting blades 13,13 to start to cut the article 50. As the cutting operation proceeds, the protective metal support members 45,45 are operatively depressed by the cutting blades 13,13 causing members 45,45 to move yieldingly downward in a restricted or damped manner by virtue of their operative connection with the action of the piston-and-cylinder means 41, while still being pressed against the flanges 51,51 to prevent the same from buckling. Cutting is therefore completed over the entire length of the blades. Both the flanges 51,51 are cut off from the connecting web 52 at the same time at the junctions between the web 52 and the flanges 51.

The cross member 15 and cutting blades 13,13 are relatively disposed so that member 15 provides backup support for the cut web to prevent its undue buckling during the flange-cutting operation. Support members 45,45 are supportingly connected to the crossbeam 44, which crossbeam 44, in turn is supported at its opposite ends by connections at 43 with the opposed hydraulic cylinders 40 and 41, in FIG. 1. Therefore, the downward movement of support members 45,45 is relayed to and exerted against the pistons in the piston-and-cylinder means 40,41, which have an operating fluid such as hydraulic oil, whereby said fluid will act as a camping agent to restrict such movement, responsive to proper setting of the associated fluid control system.

After the completion of the cutting operation, the cylinder means are operated and returned to the original state in preparation for the placement of the next article, which is followed by the cutting operation described above. The cut-off pieces are ejectingly discharged from the apparatus by the article subsequently fed thereto.

The pressure source for the respective piston-and-cylinder means of this invention may be oil pressure, water pressure or the like. The articles to be cut may be various wide-flange sections, as referred to above, or channels (see FIG. 4). In the case of angles with equal or unequal legs, two angles are arranged edge-to-edge in opposing relation and then cut in the same manner as channels.

ALTERNATIVE EMBODIMENT

Figure 5:
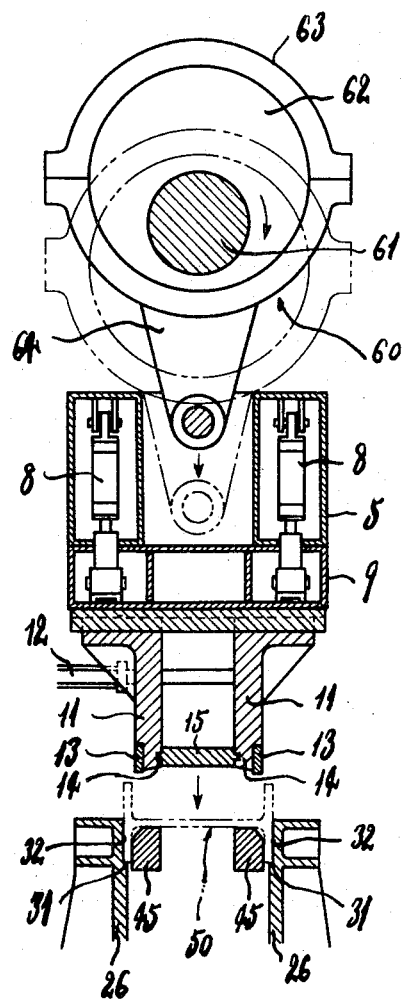
FIG. 5 is a view generally like FIG. 2 but shown essentially in full cross-section and showing the principal part of a different embodiment of pressing and retracting means for the cutter or shearing head.
Figure 3:
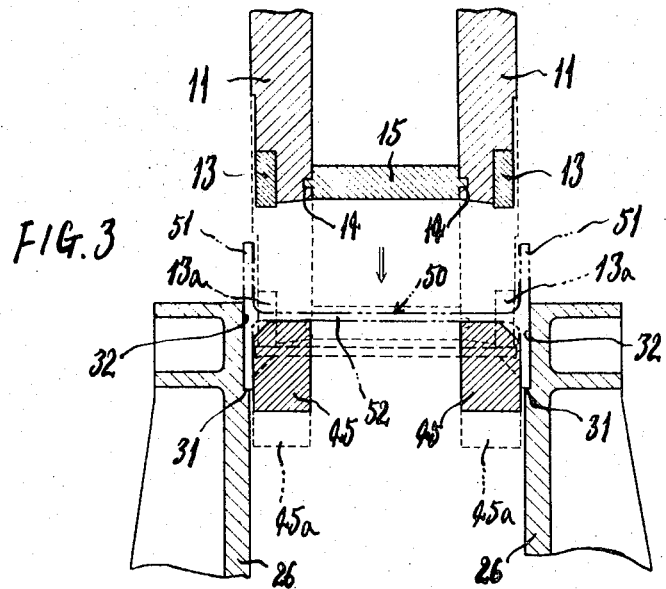
FIG. 3 is an enlarged scale fragmentary cross-section view of the major support means and cutting blades in relation to a dash-dot outlined shaped article, with the apparatus shown in solid lines before initiation of cutting operation, and with certain parts shown in dotted lines to depict the cutting operational movements.

According to this invention, the hydraulic means by which the cutting blades are pressed against or retracted from the article to be cut may be replaced by mechanical pressing and retracting means such as crank means 60 utilizing an eccentric mechanism (see FIG. 5). The illustrated crank means includes an eccentric, disc 62 rotatable with a rotary shaft 61 and carrying a case 63 rotatably fitted around the disc by means of a bearing or the like. The case 63 is preferably in two parts, one of which has a connecting member 64 depending therefrom and attached to the slider or header 5 so as to render the slider 5 movable up and down, to otherwise effect shearing in the same manner. Because the rest of the components remain the same, like reference characters are retained to identify the same corresponding parts shown in conjunction therewith.

It will be apparent from the foregoing description that both of the flanges of a steel section, such as a wide-flange section, can be cut off from its web simultaneously at the junctions at the opposite ends of the web. Thus the invention has the advantage that the cutting operation can be effected efficiently within a short period of time without causing various environmental problems that have heretofore been experienced with gas torch cutting. Moreover, the cut portions are uniform in shape and free of any changes in properties. The operation produces no waste chips and therefore does not involve loss of material to be cut. Briefly, the invention assures a very safe, economical, efficient and technically excellent cutting operation.

While two specific examples have been described hereinabove, other changes and modifications may be made by those skilled in the art without departing from the inventive spirit and scope as defined in the annexed claims.

What is claimed is:

1. Apparatus for cutting off opposite flanges from the connecting web of shaped steel articles, with the cutting being at the junctions between inner faces of the flanges and said web, comprising in combination:
    a. two cutting blades assembled in rigid spaced apart parallel relation with means to selectively preadjust the distance therebetween for different size shaped sections to be cut;
    b. means by which the cutting blades are mechanically advanced to be pressed against and retracted from an article to be cut,
    c. adjustable support means including two supports having support portions for supporting said flanges of an article to be cut, and for bearing a force acting on the article during cutting, and also having flange clamping or engaging face portions to accomodate the article to be held and cut;
    d. two protective rigid support members adjustably spaced apart by means for expansively and retractively adjusting the distance therebetween to move said members into pressing contact with the inner faces of the flanges of the article to be cut, and to protectively support said article to thereby prevent the flanges from buckling; and
    e. further including means connected with said protective support members adapted to adjust their said pressing contact position with said flanges, and means enabling said support members to retract as the cutting blades are advanced.

2. The cutting apparatus as defined in claim 1 wherein the means of paragraph (b) for pressing and retracting said cutting blades are hydraulically operable piston-and-cylinder assemblies.

3. The cutting apparatus as defined in claim 1 wherein the means of paragraph (b) for pressing and retracting said cutting blades include an eccentrically operable crank mechanism operably connected with said blades.

4. Apparatus as defined in claim 2, wherein the apparatus includes a supporting frame and slidable header therewithin to which said cutting blades are operably connected; and said hydraulically operable means include first hydraulic cylinder-and-piston means operably interposed between said frame and slidable header to selectively raise and lower said header, and second hydraulic cylinder-and-piston means within said slidable header to selectively adjust the angle of the cutting blades relative to said header and said article to be cut.

5. Apparatus as defined in claim 1 wherein said means for expansively and retractively adjusting the distance between said two protective rigid support members of paragraph (d) include independent hydraulic piston-and-cylinder means.

6. Apparatus as defined in claim 4 wherein said means of paragraph (e) enabling said support members to retract responsive to advancement cutting of said blades include third hydraulic piston-and-cylinder means operably interconnecting said support members with frame.

* * * * *